(12) United States Patent
Zou

(10) Patent No.: US 9,785,594 B2
(45) Date of Patent: Oct. 10, 2017

(54) MICRO SERVER AND SWITCH DEVICE THEREOF

(71) Applicants: Inventec (Pudong) Technology Corporation, Shanghai (CN); INVENTEC CORPORATION, Taipei (TW)

(72) Inventor: Xiao-Bing Zou, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 170 days.

(21) Appl. No.: 14/921,077

(22) Filed: Oct. 23, 2015

(65) Prior Publication Data

US 2016/0364356 A1    Dec. 15, 2016

(30) Foreign Application Priority Data

Jun. 9, 2015 (CN) .......................... 2015 1 0311982

(51) Int. Cl.
G06F 13/42 (2006.01)
G06F 13/40 (2006.01)
G06F 13/362 (2006.01)

(52) U.S. Cl.
CPC ........ *G06F 13/4022* (2013.01); *G06F 13/362* (2013.01); *G06F 13/4068* (2013.01); *G06F 13/4282* (2013.01)

(58) Field of Classification Search
CPC .............. G06F 13/4022; G06F 13/362; G06F 13/4282; G06F 13/4068
See application file for complete search history.

(56) References Cited

U.S. PATENT DOCUMENTS

| | | | |
|---|---|---|---|
| 2014/0059266 A1* | 2/2014 | Ben-Michael | G06F 13/385 710/313 |
| 2015/0052389 A1* | 2/2015 | Swanson | G06F 11/2023 714/11 |
| 2015/0127994 A1* | 5/2015 | Sankar | G06F 11/3636 714/45 |
| 2016/0170849 A1* | 6/2016 | Cheng | G06F 11/2025 714/11 |

* cited by examiner

*Primary Examiner* — Jing-Yih Shyu
(74) *Attorney, Agent, or Firm* — Maschoff Brennan

(57) ABSTRACT

A micro server is provided. The micro server includes a plurality of computer boards, at least one switch device, and a baseboard. The plurality of computer boards are for data processing. The switch device is electrically connected to the plurality of computer boards and is for data communication between the plurality of computer boards. The baseboard is for data communication and power supply. The communication between the plurality of computer boards is through the baseboard and the plurality of computer boards communicate with the switch device and the external network by Serial Rapid I/O (SRIO).

20 Claims, 6 Drawing Sheets

MICRO SERVER AND SWITCH DEVICE THEREOF

CROSS-REFERENCE TO RELATED APPLICATIONS

This non-provisional application claims priority under 35 U.S.C. §119(a) on Patent Application No. 201510311982.0 filed in People Republic of China on June 9, 2015, the entire contents of which are hereby incorporated by reference.

BACKGROUND OF THE INVENTION

Technical Field of the Invention

The present invention relates to a micro server and a switch device thereof, particularly relates to a micro server and a switch device thereof combining a X86 system module and a plurality of computer boards.

Description of the Related Art

The communication standard between devices is based on Transmission Control Protocol/Internet Protocol (TCP/IP) in the prior art. Point-to-point connection mechanism is provided in TCP/IP to standardize the package, address, transfer, route, and receive method in the destination. Four abstract layers are divided in software communication process of TCP/IP and protocol stack is adopted to implement different communication protocols. Different protocols with different functions in the protocol suite are classified to these four layers.

However, because the structure of TCP/IP needs four layers and many specifications, many communication resources are consumed and the response speed does not fulfill the needs when the computation unit in the server applies TCP/IP for communication.

In addition, the Open System Interconnection (OSI) model with 5 protocol layers is adopted in Ethernet between traditional servers for point-to-point connections among nodes, so that the protocols consume lots of resources. Moreover, Ethernet is suitable for applications with distributive geographical characteristic, long latency, and dynamic network allocation. However, in micro server integration applications, hundreds of sub systems are integrated in a chassis, resulting in the characteristics of a small space and a high density. When controllers based on Ethernet are adopted to handle point-to-point connections, the cost of network interface controllers supporting large bandwidth and huge amount of interfaces is higher.

Therefore, Ethernet with long latency does not fulfill the responsive performance requirement of the connections between processors in the micro server. In addition, when the connection network speed between processors is greater than 1 Gigabit Ethernet (GbE), the power consumption of the controller chips in the switch with high volume is huge, so that these chips are not suitable in the applications with high density.

SUMMARY OF THE INVENTION

A micro server includes a plurality of computer boards and at least one switch device. The plurality of computer boards are for data processing, wherein each of the plurality of computer boards includes a plurality of system on chips (SOCs), and a Serial Rapid Input Output (SRIO) module is embedded in each of the plurality of SOCs, and data communication between the plurality of SOCs is through SRIO data sent by the SRIO module of each of the plurality of SOCs. The at least one switch device is electrically connected to the plurality of computer boards and is for data communication between the plurality of computer boards. The at least one switch device includes a X86 system module and a baseboard. The X86 system module is electrically connected to an external network connected to the micro server and is for sending data between the plurality of computer boards and the external network. The baseboard is electrically connected to the plurality of computer boards and to the at least one switch device, and is for data communication and supplying power to the micro server. The plurality of computer boards communicate with the external network through the at least one switch device by SRIO.

A switch device for a micro server includes a X86 system module, a first protocol conversion unit, and a data switch module. The X86 system module is electrically connected to an external network connected to the micro server, and is for sending data inside the micro server and to the external network, routing management, and task setting. The X86 system module includes a X86 processor, a network controller, and a PHY. The X86 processor is for data processing and an Ethernet controller is embedded in the X86 processor. The network controller is electrically connected to the X86 processor and to at least one first network connector, and is for converting a first PCI-E signal sent by the X86 processor to a gigabit network signal and sending the gigabit network signal to the external network through the first network connector. The PHY is electrically connected to the X86 processor and to at least one second network connector, and is for sending data of the Ethernet controller to the external network through the second network connector. The first protocol conversion unit is electrically connected to the X86 processor, and is for converting a second PCI-E signal sent by the X86 processor to a first SRIO signal. The data switch module is electrically connected to the first protocol conversion unit, and is for switching and dispatching the first SRIO signal and providing a second SRIO signal. The data switch module sends the second SRIO signal to the plurality of computer boards of the micro server through the baseboard of the micro server for data switching between the plurality of computer boards and sending data of the plurality of computer boards to the external network.

A message exchanging method for a micro server is provided. The micro server includes a computer board and a switch device, and the computer board is electrically connected to the switch device, and the switch device includes a X86 system module, a first protocol conversion unit, and a data switch module. The message exchanging method includes the following steps. When a first message is sent to the switch device from the computer board, the data switch module receives the first message and copies the first message to a second message, and sends the first message and the second message to the first protocol conversion unit, and the first protocol conversion unit sends the first message and the second message to an external network through the X86 system module. When a third message is sent to the switch device from the external network, the X86 system module copies the third message to a fourth message and sends the third message and the fourth message to the first protocol conversion unit, and the first protocol conversion unit sends the third message and the fourth message to the computer board through the data switch module according to the information of the third message and the fourth message.

BRIEF DESCRIPTION OF THE DRAWINGS

The present invention will become more fully understood from the detailed description given herein below and the accompanying drawings, which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
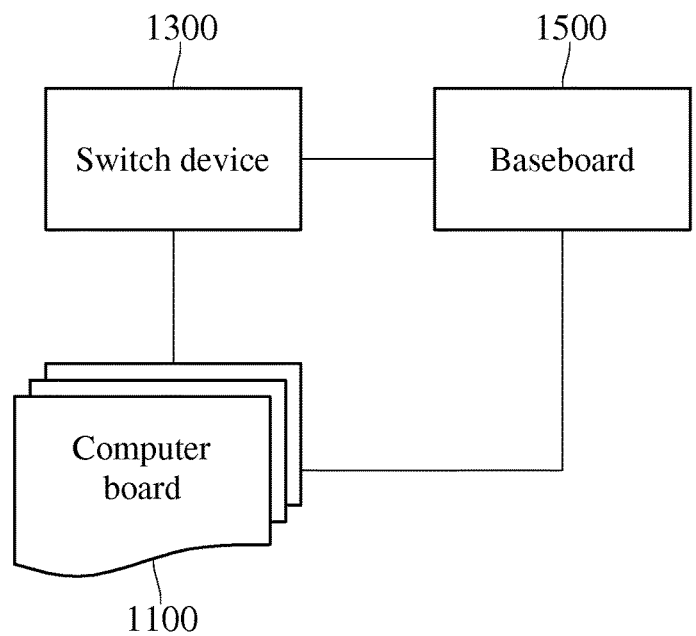
FIG. 1 is a diagram of the micro server according to an embodiment.

Please refer to FIG. 1. FIG. 1 is a diagram of the micro server according to an embodiment. As shown in FIG. 1, the micro server in an embodiment includes a plurality of computer boards 1100, at least one switch device 1300, and a baseboard 1500. The plurality of computer boards 1100 are for data processing. The switch device 1300 is electrically connected to the plurality of computer boards 1100 and is for data communication between the plurality of computer boards 1100. The baseboard 1500 is electrically connected to the plurality of computer boards 1100 and is electrically connected to the switch device 1300. The baseboard 1500 is for data communication of the micro server and is for providing power to the micro server. The data communication between the plurality of computer boards 1100 is through the baseboard 1500. The plurality of computer boards 1100 communicate with the external network through the switch device 1300 by SRIO.

In an embodiment, the micro server contains 48 computer boards. The micro server provides services by the 48 computer boards, such as email, database management, text processing, and other services. In addition, because the plurality of computer boards 1100 of the micro server also have computing power, the micro server also provides services requiring large computations, such as signal filtering, searching, and format conversion.

Figure 2:
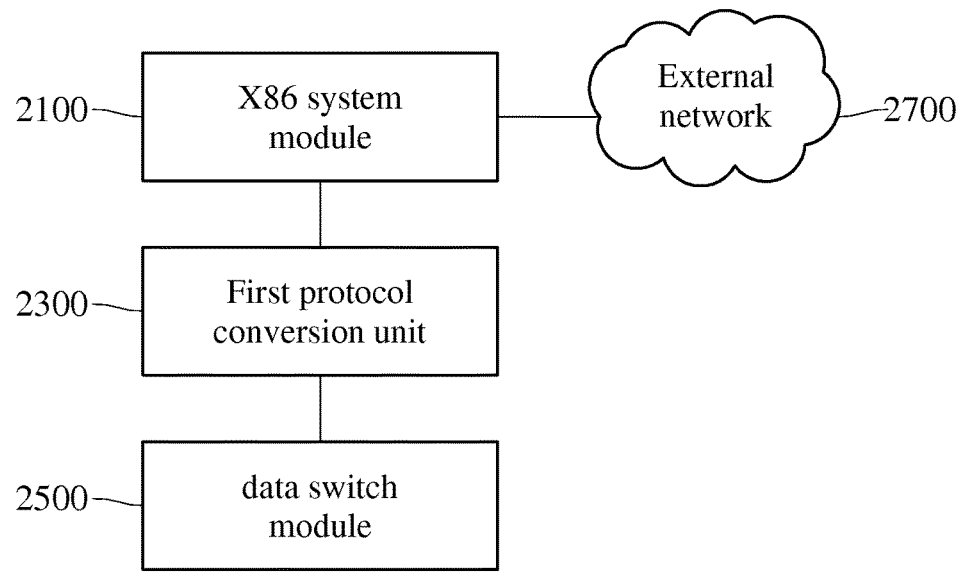
FIG. 2 is a diagram of the switch device according to an embodiment.

Please refer to FIG. 2. FIG. 2 is a diagram of the switch device according to an embodiment. As shown in FIG. 2, the switch device includes a X86 system module 2100, a first protocol conversion unit 2300, and a data switch module 2500. The X86 system module 2100 is electrically connected to an external network 2700, and is for sending data inside the micro server and data of the external network, routing management, and task setting. The first protocol conversion unit 2300 is electrically connected to the X86 system module 2100, and is for converting the second Peripheral Component Interconnect Express (PCI-E) signal sent by the X86 system module 2100 to the first Serial Rapid Input Output (SRIO) signal. The data switch module 2500 is electrically connected to the first protocol conversion unit 2300, and is for switching and dispatching the first SRIO signal, and provides a second SRIO signal. The data switch module 2500 sends the second SRIO signal to the plurality of computer boards of the micro server through the baseboard for exchanging data between the plurality of computer boards and sending data from the plurality of computer boards to the external network. In an embodiment, the switch device is two central data switches supporting a communication protocol and is installed on a circuit board.

Figure 3:
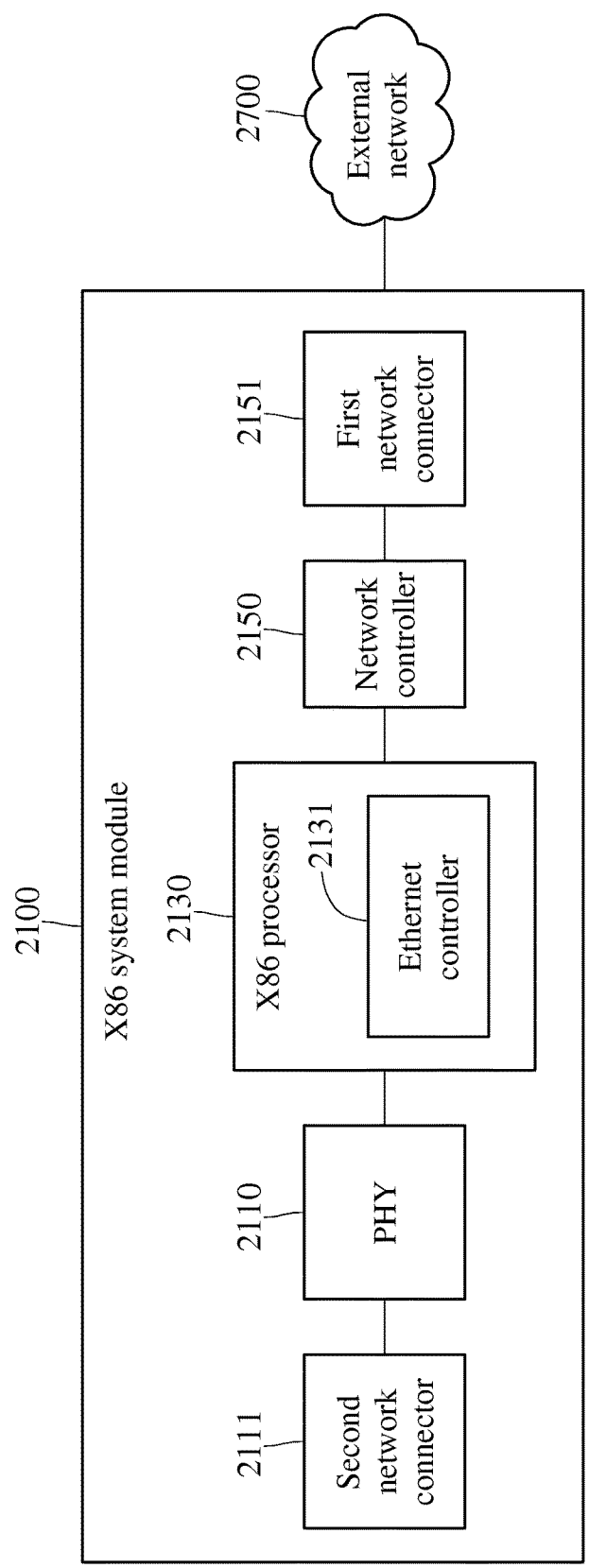
FIG. 3 is a diagram of the X86 system module according to an embodiment.

Please refer to FIG. 3. FIG. 3 is a diagram of the X86 system module according to an embodiment. As shown in FIG. 3, the X86 system module 2100 further includes a X86 processor 2130, a network controller 2150, and a Port Physical Layer (PHY) 2110. The X86 system module 2100 is electrically connected to an external network 2700. The X86 processor 2130 is for data processing and an Ethernet controller 2131 is embedded in the X86 processor 2130. The network controller 2150 is electrically connected to the X86 processor 2130 and to at least one first network connector 2151, and is for converting a first PCI-E signal sent by the X86 processor 2130 to a gigabit network signal and sending the gigabit network signal to the external network 2700 through the first network connector 2151. The PHY 2110 is electrically connected to the X86 processor 2130 and to at least one second network connector 2111, and is for sending data of the Ethernet controller 2131 to the external network 2700 through the second network connector 2111.

Figure 4:
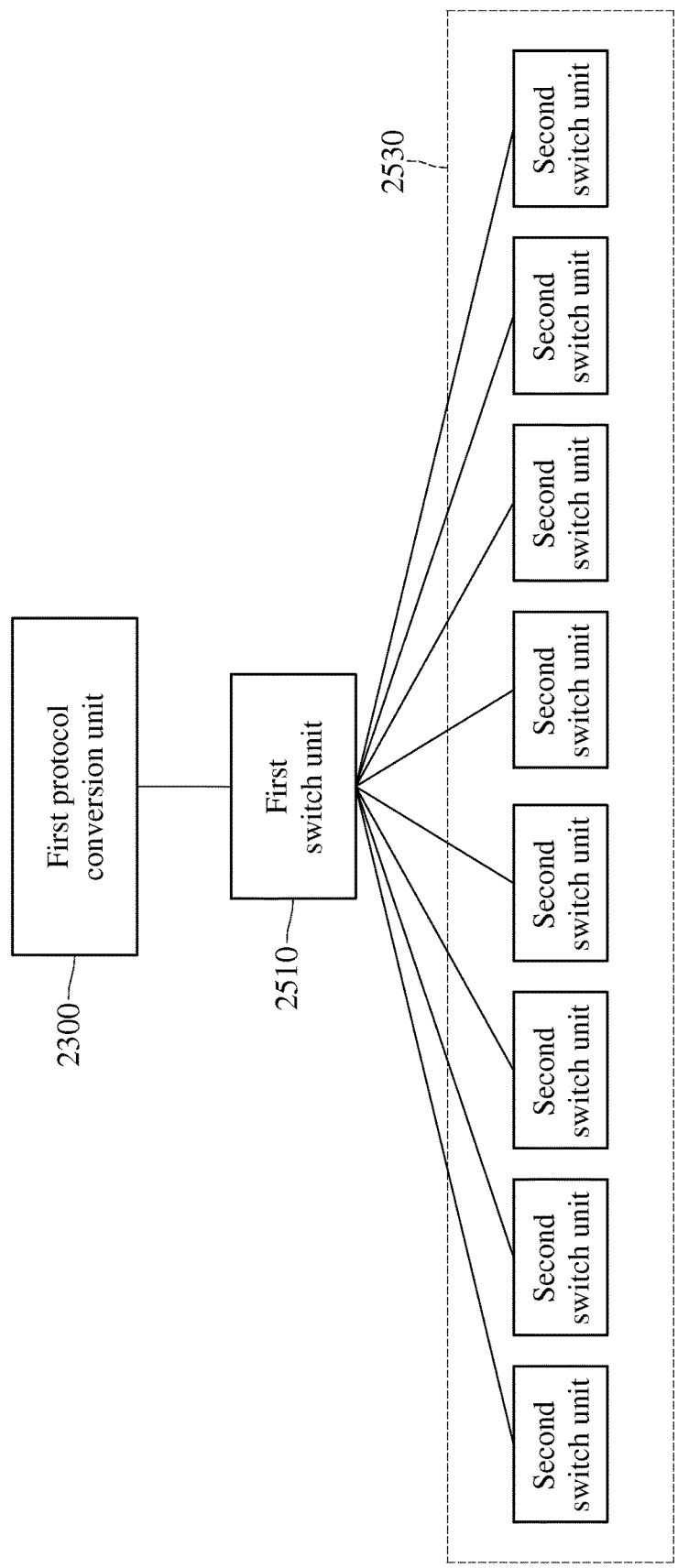
FIG. 4 is a diagram of the data switch module according to an embodiment.

In addition, the data switch module is a two level switch. Please refer to FIG. 4. FIG. 4 is a diagram of the data switch module according to an embodiment. As shown in FIG. 4, the data switch module includes a first switch unit 2510 and a plurality of second switch units 2530. The first switch unit 2510 is electrically connected to the first protocol conversion unit 2300, and is for switching the first SRIO signal to a third SRIO signal. The plurality of second switch units 2530 are electrically connected to the first switch unit 2510 and to the plurality of computer boards respectively, and are for switching and dispatching the third SRIO signal to the second SRIO signal and sending the second SRIO signal to the plurality of computer boards.

Figure 5:
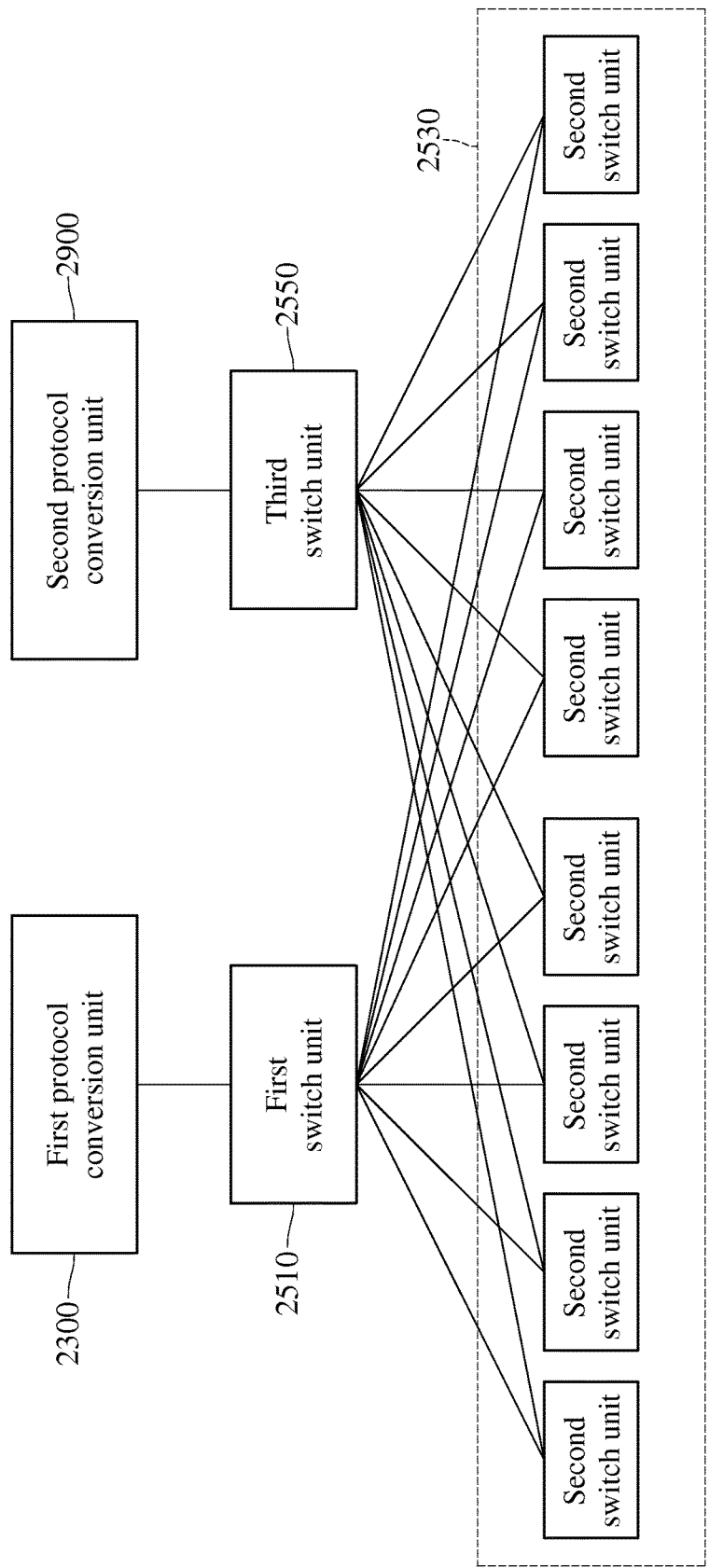
FIG. 5 is a diagram of the data switch module according to another embodiment.

Please refer to FIG. 5. FIG. 5 is a diagram of the data switch module according to another embodiment. As shown in FIG. 5, in another embodiment, the switch device further includes a second protocol conversion unit 2900 and a third switch unit 2550. The third switch unit 2550 is electrically connected to the second protocol conversion unit 2900 and the second switch unit 2530, and is for switching the fourth SRIO signal to a fifth SRIO signal and sending the fifth SRIO signal to the plurality of computer boards. The first protocol conversion unit 2300 and the second protocol conversion unit 2900 are redundant to each other and the first switch unit 2510 and the third switch unit 2550 are redundant to each other.

Figure 6:
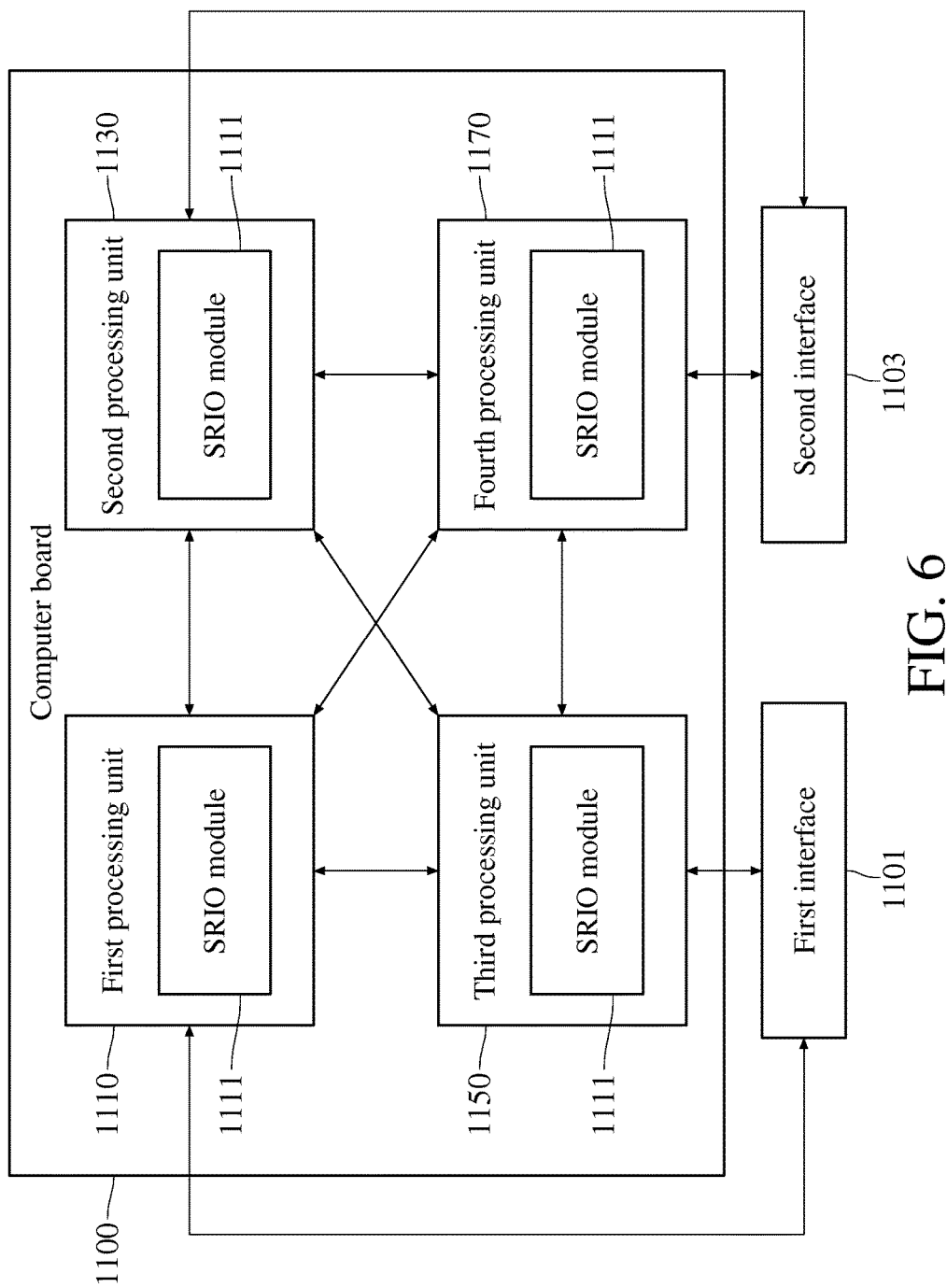
FIG. 6 is a diagram of the computer board according to an embodiment.

Each of the plurality of computer boards includes a plurality of SOCs, and a SRIO module is embedded in each of the plurality of SOCs. SRIO data are sent through the plurality of SRIO modules between the plurality of SOCs for data communication. When one of the plurality of the SOCs on the plurality of computer boards fails, the plurality of computer boards perform computation through the plurality of the SOCs which are not failed. For example, please refer to FIG. 6. FIG. 6 is a diagram of the computer board according to an embodiment. As shown in FIG. 6, each of the plurality of computer boards 1100 includes 4 SOCs, that is, the first processing unit 1110, the second processing unit 1130, the third processing unit 1150, and the fourth processing unit 1170. The first processing unit 1110, the second processing unit 1130, the third processing unit 1150, and the fourth processing unit 1170 communicate and send data to each other through the plurality of SRIO modules 1111.

In addition, the computer board includes a first interface 1101 and a second interface 1103 for receiving and sending the external message. The first processing unit 1110 and the third processing unit 1150 are electrically connected to the first interface 1101, and the second processing unit 1130 and the fourth processing unit 1170 are electrically connected to the second interface 1103. When the external message is sent to the computer board, the message is sent through the first interface 1101 or the second interface 1103 to the target processing unit, and the first interface 1101 and the second interface 1103 are redundant to each other. For example, when a message is required to be sent to the first processing unit 1110 and the first interface 1101 works normally, the message is sent successfully. When the first interface 1101 does not work normally, the message is still sent to the second processing unit 1130 or the fourth processing unit 1170 through the second interface 1103, and is sent to the first processing unit 1110 through the SRIO module 1111. Therefore, the message is ensured to be sent successfully. The computer board in the present embodiment is for illustrating but not for limiting the present invention.

In an embodiment, the SOC of the computer board is a SOC with computation power. For example, the SOC is an application-specific integrated circuit (ASIC), an advanced RISC machine (ARM), a central processing unit (CPU), a single chip controller, or any other device suitable for computation. In addition, the computer board exchanges information with the switch device through SRIO 2.0 protocol, and 4 interfaces supporting SRIO 2.0 protocol are embedded in the computer board. The embodiment is for illustrating but not for limiting the present invention.

In addition, a message exchanging method for the micro server is provided. The micro server includes a computer board and a switch device. The computer board is electrically connected to the switch device. The switch device includes a X86 system module, a first protocol conversion unit, and a data switch module. The message exchanging method includes the following steps. When a first message is sent to the switch device from the computer board, the data switch module receives the first message and copies the first message to a second message, and sends the first message and the second message to the first protocol conversion unit. The first protocol conversion unit sends the first message and the second message to an external network through the X86 system module.

When a third message is sent from the external network to the switch device, the X86 system module copies the third message to a fourth message and sends the third message and the fourth message to the first protocol conversion unit. The first protocol conversion unit sends the third message and the fourth message to the computer board through the data switch module according to the information of the third message and the fourth message.

In an embodiment, the computer board includes a plurality of SOCs, and a SRIO module is embedded in each of the plurality of SOCs, and data communication between the plurality of SOCs is through SRIO data sent by the SRIO module of each of the plurality of SOCs. When the computer board receives a message, the computer board directly sends the message to a target SOC or sends the message to the target SOC through the SRIO module between the plurality of SOCs.

In an embodiment, because the data switch module is a two level switch including a first switch unit and a plurality of second switch units. When the first protocol conversion unit receives a message, the message is sent to the first switch unit, and the first switch unit sends the message to the plurality of second switch units. In another embodiment, when the plurality of second switch units receive a message, the message is sent to the first switch unit, and the first switch unit sends the message to the first protocol conversion unit.

It is worth mentioning that the first message and the second message are redundant to each other, and the third message and the fourth message are redundant to each other. Therefore, when the first message or the second message is lost, the other message is still sent to the destination, so that the correctness of message delivery in the system structure is ensured.

Figure 7:
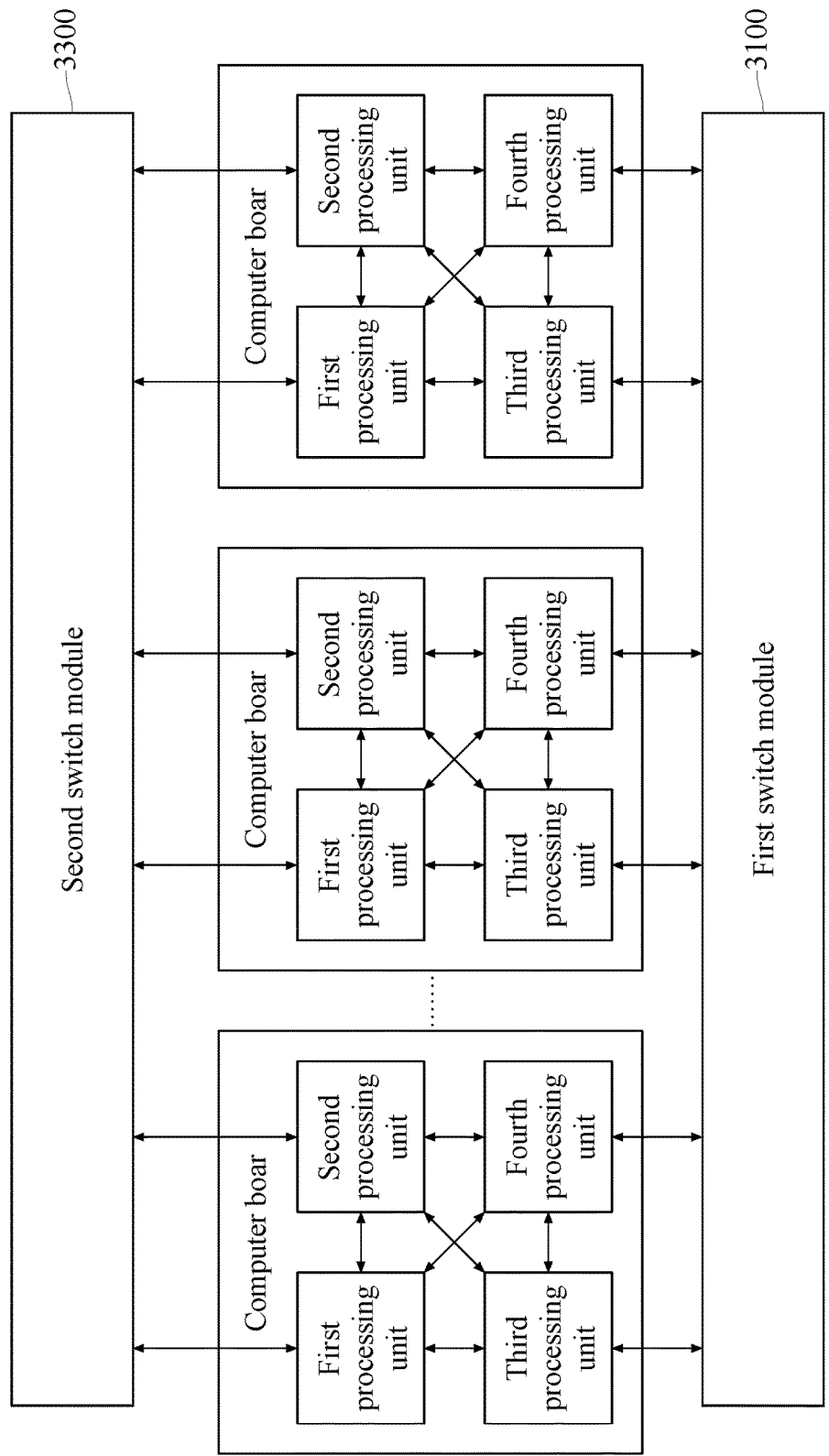
FIG. 7 is a diagram of the computer board and the switch module according to an embodiment.

Please refer to FIG. 7. FIG. 7 is a diagram of the computer board and the switch module according to an embodiment. As shown in FIG. 7, the plurality of computer boards 1110 in the micro server are electrically connected to a first switch module 3100 and a second switch module 3300. The first switch module 3100 and the second switch module 3300 are redundant to each other. When one of the first switch module 3100 and the second switch module 3300 is malfunctioned, the plurality of computer boards exchanges information through the normal switch module. For example, when the first switch module 3100 is malfunctioned, the plurality of computer boards exchanges information through the second switch module 3300. When the second switch module 3300 is malfunctioned, the plurality of computer boards exchanges information through the first switch module 3100. Therefore, the correctness of message delivery in the system structure is ensured.

The micro server in an embodiment of the present invention includes a plurality of computer boards, at least one switch device, and a baseboard. The plurality of computer boards are for data processing. The switch device is electrically connected to the plurality of computer boards, and is for data communication between the plurality of computer boards. The switch device includes a X86 system module. The X86 system module is electrically connected to an external network connected to the micro server, and is for sending data between the plurality of computer boards and the external network. The baseboard is electrically connected to the plurality of computer boards and the switch device. The baseboard is for data communication and supplying power to the micro server. By the integration of the components, the micro server provides services such as email, database management, text processing, and other services. In addition, because the plurality of computer boards 1100 of the micro server also have computing power, the micro server also provides services requiring large computations, such as signal filtering, searching, and format conversion.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments of the invention. It is intended, therefore, that the specification and examples be considered as exemplary only, with a true scope and spirit of the invention being indicated by the following claims and their full scope of equivalents.

What is claimed is:

1. A micro server, comprising:
   a plurality of computer boards for data processing, wherein each of the plurality of computer boards includes a plurality of system on chips (SOCs), and a Serial Rapid Input Output (SRIO) module is embedded in each of the plurality of SOCs, and data communication between the plurality of SOCs is through SRIO data sent by the SRIO module of each of the plurality of SOCs;

at least one switch device electrically connected to the plurality of computer boards, for data communication between the plurality of computer boards, comprising:
a X86 system module electrically connected to an external network connected to the micro server, for sending data between the plurality of computer boards and the external network; and
a baseboard electrically connected to the plurality of computer boards and to the at least one switch device, for data communication and supplying power to the micro server;
wherein the plurality of computer boards communicate with the external network through the at least one switch device by SRIO.

2. The micro server of claim 1, wherein the X86 system module further comprising:
a X86 processor for data processing, an Ethernet controller embedded in the X86 processor;
a network controller electrically connected to the X86 processor and to at least one first network connector, for converting a first Peripheral Component Interconnect Express (PCI-E) signal sent by the X86 processor to a gigabit network signal and sending the gigabit network signal to the external network through the first network connector; and
a Port Physical Layer (PHY) electrically connected to the X86 processor and to at least one second network connector, for sending data of the Ethernet controller to the external network through the second network connector.

3. The micro server of claim 2, wherein the at least one switch device further comprising:
a first protocol conversion unit electrically connected to the X86 processor, for converting a second PCI-E signal sent by the X86 processor to a first SRIO signal; and
a data switch module electrically connected to the first protocol conversion unit, for switching and dispatching the first SRIO signal and providing a second SRIO signal;
wherein the data switch module sends the second SRIO signal to the plurality of computer boards of the micro server through the baseboard of the micro server for data switching between the plurality of computer boards and sending data of the plurality of computer boards to the external network.

4. The micro server of claim 1, wherein when one of the plurality of the SOCs on the plurality of computer boards fails, the plurality of computer boards perform computation through the plurality of the SOCs which are not failed.

5. The micro server of claim 1, wherein the at least one switch device are two switch devices, and when one of the switch devices fails, the plurality of SOCs of the plurality of computer boards exchange information through the other switch device which is not failed.

6. The micro server of claim 1, wherein the at least one switch device is two central data switches supporting a communication protocol and is installed on a circuit board.

7. The micro server of claim 1, wherein the plurality of computer boards exchanges information with the at least one switch device through SRIO 2.0 protocol, and 4 interfaces supporting SRIO 2.0 protocol are embedded in each of the plurality of computer boards.

8. The micro server of claim 1, wherein the micro server contains 48 computer boards.

9. A switch device for a micro server, comprising:
a X86 system module electrically connected to an external network connected to the micro server, for sending data inside the micro server and to the external network, routing management, and task setting, the X86 system module comprising:
a X86 processor for data processing, an Ethernet controller embedded in the X86 processor;
a network controller electrically connected to the X86 processor and to at least one first network connector, for converting a first PCI-E signal sent by the X86 processor to a gigabit network signal and sending the gigabit network signal to the external network through the first network connector; and
a PHY electrically connected to the X86 processor and to at least one second network connector, for sending data of the Ethernet controller to the external network through the second network connector;
a first protocol conversion unit electrically connected to the X86 processor, for converting a second PCI-E signal sent by the X86 processor to a first SRIO signal; and
a data switch module electrically connected to the first protocol conversion unit, for switching and dispatching the first SRIO signal and providing a second SRIO signal;
wherein the data switch module sends the second SRIO signal to the plurality of computer boards of the micro server through the baseboard of the micro server for data switching between the plurality of computer boards and sending data of the plurality of computer boards to the external network.

10. The switch device of claim 9, wherein the data switch module is a two level switch and comprises:
a first switch unit electrically connected to the first protocol conversion unit, for switching the first SRIO signal to a third SRIO signal; and
a plurality of second switch units electrically connected to the first switch unit and to the plurality of computer boards respectively, for switching and dispatching the third SRIO signal to the second SRIO signal and sending the second SRIO signal to the plurality of computer boards.

11. The switch device of claim 9, wherein the switch device is installed on a circuit board.

12. The switch device of claim 9, wherein the X86 system module further comprises a network interface controller, and the network interface controller is electrically connected to the X86 processor and the external network, and the network interface controller is for switching rapid data of the X86 processor and data of the external network.

13. The switch device of claim 9, further comprising a second protocol conversion unit electrically connected to the X86 processor, for converting the second PCI-E signal sent by the X86 processor to a fourth SRIO signal.

14. The switch device of claim 13, further comprising a third switch unit electrically connected to the second protocol conversion unit and the plurality of second switch units, for switching the fourth SRIO signal to a fifth SRIO signal and sending the fifth SRIO signal to the plurality of computer boards.

15. The switch device of claim 14, wherein the first protocol conversion unit and the second protocol conversion unit are redundant to each other and the first switch unit and the third switch unit are redundant to each other.

16. A message exchanging method for a micro server, the micro server comprising a computer board and a switch device, the computer board electrically connected to the switch device, the switch device comprising a X86 system module, a first protocol conversion unit, and a data switch module, the message exchanging method comprising:
- when a first message is sent to the switch device from the computer board, the data switch module receiving the first message and copying the first message to a second message, and sending the first message and the second message to the first protocol conversion unit, and the first protocol conversion unit sending the first message and the second message to an external network through the X86 system module; and
- when a third message is sent to the switch device from the external network, the X86 system module copying the third message to a fourth message and sending the third message and the fourth message to the first protocol conversion unit, and the first protocol conversion unit sending the third message and the fourth message to the computer board through the data switch module according to the information of the third message and the fourth message.

17. The message exchanging method of claim 16, wherein the computer board includes a plurality of SOCs, and a SRIO module is embedded in each of the plurality of SOCs, and data communication between the plurality of SOCs is through SRIO data sent by the SRIO module of each of the plurality of SOCs, and when the computer board receives a message, the computer board directly sends the message to a target SOC or sends the message to the target SOC through the SRIO module between the plurality of SOCs.

18. The message exchanging method of claim 16, wherein the data switch module is a two level switch comprising a first switch unit and a plurality of second switch units, and when the first protocol conversion unit receives a message, the message is sent to the first switch unit, and the first switch unit sends the message to the plurality of second switch units.

19. The message exchanging method of claim 16, wherein the data switch module is a two level switch comprising a first switch unit and a plurality of second switch units, and when the plurality of second switch unit receive a message, the message is sent to the first switch unit, and the first switch unit sends the message to the first protocol conversion unit.

20. The message exchanging method of claim 16, wherein the first message and the second message are redundant to each other, and the third message and the fourth message are redundant to each other.

\* \* \* \* \*